United States Patent [19]
Dworakowski et al.

[11] Patent Number: 5,787,816
[45] Date of Patent: Aug. 4, 1998

[54] AUTO RACK SIDE PANEL ASSEMBLY

[75] Inventors: Peter S. Dworakowski, Mokena, Ill.; James C. Robertson; Ralph H. Schorr, both of Lawrenceville, Ga.

[73] Assignee: Thrall Car Manufacturing Company, Chicago Heights, Ill.

[21] Appl. No.: 717,929

[22] Filed: Sep. 23, 1996

[51] Int. Cl.$^6$ ........................................ B61D 49/00
[52] U.S. Cl. ........................................ 105/404; 105/355
[58] Field of Search ........................ 105/355, 396, 105/409, 404, 423, 424, 452; 296/191, 187, 193; 410/2, 3, 4

[56] References Cited

U.S. PATENT DOCUMENTS

| | | | |
|---|---|---|---|
| 2,009,614 | 7/1935 | Geyer | 105/452 |
| 4,059,056 | 11/1977 | Berryman et al. | |
| 4,913,061 | 4/1990 | Youngblood | |
| 4,964,347 | 10/1990 | Long et al. | |
| 5,311,823 | 5/1994 | Rudibaugh et al. | 105/355 |
| 5,415,108 | 5/1995 | Murphy et al. | 105/355 |
| 5,472,290 | 12/1995 | Hulls | 296/191 |
| 5,579,697 | 12/1996 | Burke | 105/355 |

*Primary Examiner*—Mark Tuan Le
*Attorney, Agent, or Firm*—Fitch, Even, Tabin & Flannery

[57] ABSTRACT

A novel method and apparatus for installing and securing auto rack side panels, either during manufacture of the auto rack railway car, or during refurbishment of the car, where covers are placed over components which clamp the panel corners. In a preferred embodiment of the invention wherein end portions of elongated dust closure plates are employed to clamp side panel corners against brackets to prevent metal-to-metal contact between the end portions of the dust closure plates and the side panel corners engaged by the end portions thereof, plate covers are installed over the end portions of the elongated dust closure plates so as to be disposed between the end portions of the dust cover plates and the panel corners, to avoid abrasion and rusting as a result of friction. In accordance with a further feature of a preferred embodiment of the invention, there are provided a plurality of bracket covers which fit over the brackets between the brackets and the panel corners engaged thereby to avoid abrasion and rusting resulting from friction with the brackets.

17 Claims, 8 Drawing Sheets

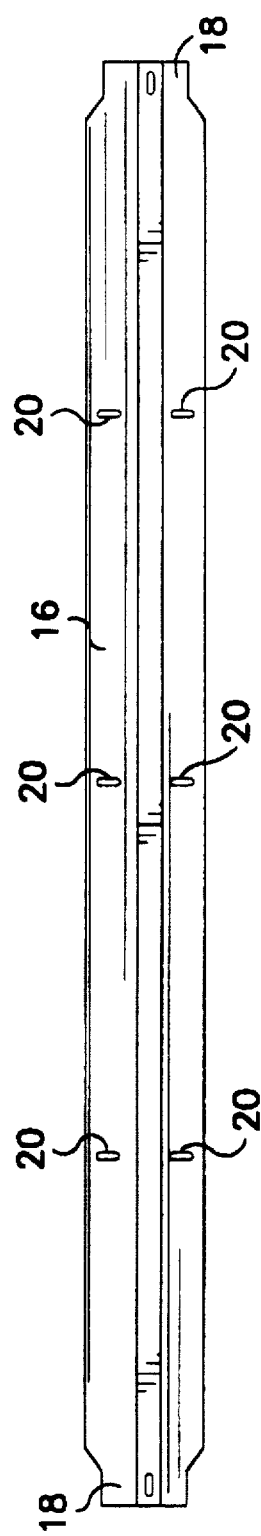
FIG. 4
FIG. 5

AUTO RACK SIDE PANEL ASSEMBLY

BACKGROUND OF THE INVENTION

The invention relates generally to auto rack railway cars, and more particularly to apparatus for engaging the corners of auto rack side panels, and a method for installing the auto rack side panels and associated components for engaging their corners.

Auto rack railway cars typically have side walls which employ a plurality of generally rectangular, perforated galvanized steel panels or "screens" to protect automotive vehicles carried on the auto rack, and to restrict access to the interior of the railway car. The side panels are typically supported at their corners by steel brackets mounted on vertical posts. Clamping arrangements are typically employed to grip each corner of each panel between a bracket and a plate which are secured to each other by mechanical fasteners. The side panels typically have limited freedom of movement to accommodate flexure of the auto rack frame.

A problem which has long been recognized in the construction and maintenance of auto rack cars is that elongated, horizontally extending gaps between vertically adjacent side panels may permit undesirably high levels of ingress of dust, rust particles, and other airborne particles and the like in certain operating environments. The horizontal gaps also may be undesirably usable by unauthorized persons in climbing up the side walls of auto rack cars.

In the past, elongated, horizontally extending galvanized steel dust closure plates have been employed to close the gaps. The galvanized steel plates have had a sufficient vertical dimension to span the gap, and typically have been fastened by conventional Huck fasteners or other fasteners to panels above and below the gaps. The ends of the elongated plates have been fastened to the brackets so that the side panel corners are clamped between the ends of the plates and the brackets.

It has long been recognized that metal-to-metal contact between the side panel corners and the brackets and associated plates may be problematic. This problem has been recognized both with the elongated plates described above and with other clamping arrangements. Various efforts have been made to prevent such metal-to-metal contact.

For example, U.S. Pat. No. 4,964,347 discloses the use of corner piece envelopes which are snapped on to the corners of the side panels before installation. U.S. Pat. No. 4,059,056 discloses a vinyl coating on channel members supporting panel wall sections. U.S. Pat. No. 4,913,061 suggests coating the brackets with a nylon coating.

It is a general object of the invention to provide a novel and improved apparatus and method for installing and supporting auto rack side panels while avoiding metal-to-metal contact between the side panel corners and the supporting brackets and plates.

It is a further object of the invention to provide a cost-effective and commercially viable method and apparatus for installing and securing auto rack side panels.

SUMMARY OF THE INVENTION

The invention provides a novel method and apparatus for installing and securing auto rack side panels, either during manufacture of the auto rack railway car, or during refurbishment of the car, in which covers made of a suitable non-abrasive material such as a suitable plastic or elastomer are placed over apparatus for clamping the panel corners.

In a preferred embodiment of the invention wherein end portions of elongated dust closure plates are employed to clamp side panel corners against brackets to prevent metal-to-metal contact between the end portions of the dust closure plates and the side panel corners engaged by the end portions thereof, plate covers are installed over the end portions of the elongated dust closure plates so as to be disposed between the end portions of the dust cover plates and the panel corners, to avoid abrasion and rusting as a result of friction. In alternative embodiments, the covers may be used with discrete, relatively small clamping plates to secure the panel corners, instead of the ends of elongated dust closure plates.

In accordance with a further feature of a preferred embodiment of the invention, there are provided a plurality of bracket covers which fit over the brackets between the brackets and the panel corners engaged thereby to avoid abrasion and rusting resulting from friction with the brackets.

Means are preferably provided on the plate covers and on the bracket covers to provide mechanical interengagement between the end portions and the brackets respectively. The means to provide mechanical interengagement may comprise, for example, tab-in-slot arrangements; provision of peripheral tabs engaging peripheral edge portions of one or another of the cover and the bracket or plate end; adhesives; separate, discrete mechanical fasteners; tape; or other suitable alternatives.

Each bracket cover preferably comprises a thin, preformed discrete plastic or elastomeric item having a generally hat-shaped profile corresponding to the generally hat-shaped profile of the bracket with which it is paired in operation. Each bracket cover preferably comprises a central channel-shaped portion and a pair of flange portions extending outward on either side thereof. The bracket cover is preferably dimensioned to fit snugly on the bracket with the central portion of the bracket received within the central channel-shaped portion of the cover. The bracket cover preferably has a mounting hole preformed therein generally centrally of the central channel-shaped portion, and preferably has a pair of slots formed therein which are dimensioned to fit a pair of tabs on the auto rack panel support bracket. The bracket cover is preferably dimensioned so as to entirely cover the outer side of the bracket without protruding substantially beyond the edges thereof.

The clamp plate cover preferably comprises a thin, preformed plastic or elastomeric item of defined shape having a generally rectangular configuration with an outer surface for engaging an end portion of the plate, an inner surface for engaging the side panel, and means for holding the cover in place on the end portion of the plate during installation of the plate. The clamp plate cover preferably comprises one or more tabs defining a slot for receiving an edge of the plate, and has a mounting hole preferably preformed therein generally centrally thereof. The attachment means preferably comprise a pair of end tabs on an end edge of the cover spaced from the outer surface of the cover by a dimension approximately equal to a thickness of the plate so that an end edge of the plate may be received between the end tabs and the outer surface of the cover, a bottom tab on the bottom edge of the cover, and an upper tab on the upper edge of the cover, with the bottom and upper tabs being spaced from one another by a distance about equal to a vertical dimension of the end portion of the plate between the bottom and upper tabs. Thus, the cover may be installed on the end portion of the plate by slipping the cover onto the end of the plate such that the end edge of the plate engages the tabs on the end edge of the cover, and the cover is constrained against vertical movement relative to the plate by engagement of the bottom and upper tabs with the bottom and upper edges of the end portion of the plate.

The method in accordance with the invention preferably comprises fitting the bracket covers on at least some of the brackets so that the covers are supported on the brackets, fitting the plate covers on the plates so that they are supported thereon, placing the panels in position, and clamping the panels in place such that the covers, rather than the plate and bracket, engage the corners of the side panel. Installation of the bracket covers on the brackets may comprise insertion of tabs on the brackets into slots on the bracket covers to provide an interference fit, so that the covers may be secured on the brackets prior to installation of the panels and final clamping of the panels in position.

The bracket covers and plate covers may be used at only certain corners of the side panels. In particular, they may be used, if desired, at only the intermediate corners, i.e., those corners which are vertically adjacent to other side panels, with other arrangements being made at the upper corners of the uppermost panels and at the lower corners of the lowermost panels. For example, conventional plastic envelopes of the type which snap onto the corners of the side panels may be used at the upper corners of the uppermost panels and on the lower corners of the lowermost panels.

Preferably, each of the bracket covers and each of the plate covers used at adjacent corners of vertically adjacent panels engages both of the adjacent corners, with each cover engaging the corners of two vertically adjacent panels.

BRIEF DESCRIPTION OF DRAWINGS

FIG. 4 is a side elevational view of a cover plate used in the assembly of FIG. 1.

FIG. 5 is an end elevational view of the cover plate of FIG. 4.

DETAILED DESCRIPTION OF PREFERRED EMBODIMENTS

The invention is preferably embodied in a method and apparatus for installing and securing side panels in an auto rack railway car which prevents or reduces abrasive damage to the side panel corners. The method and apparatus may be used during new car construction, and may also be used during refurbishment of existing cars.

Figure 1:
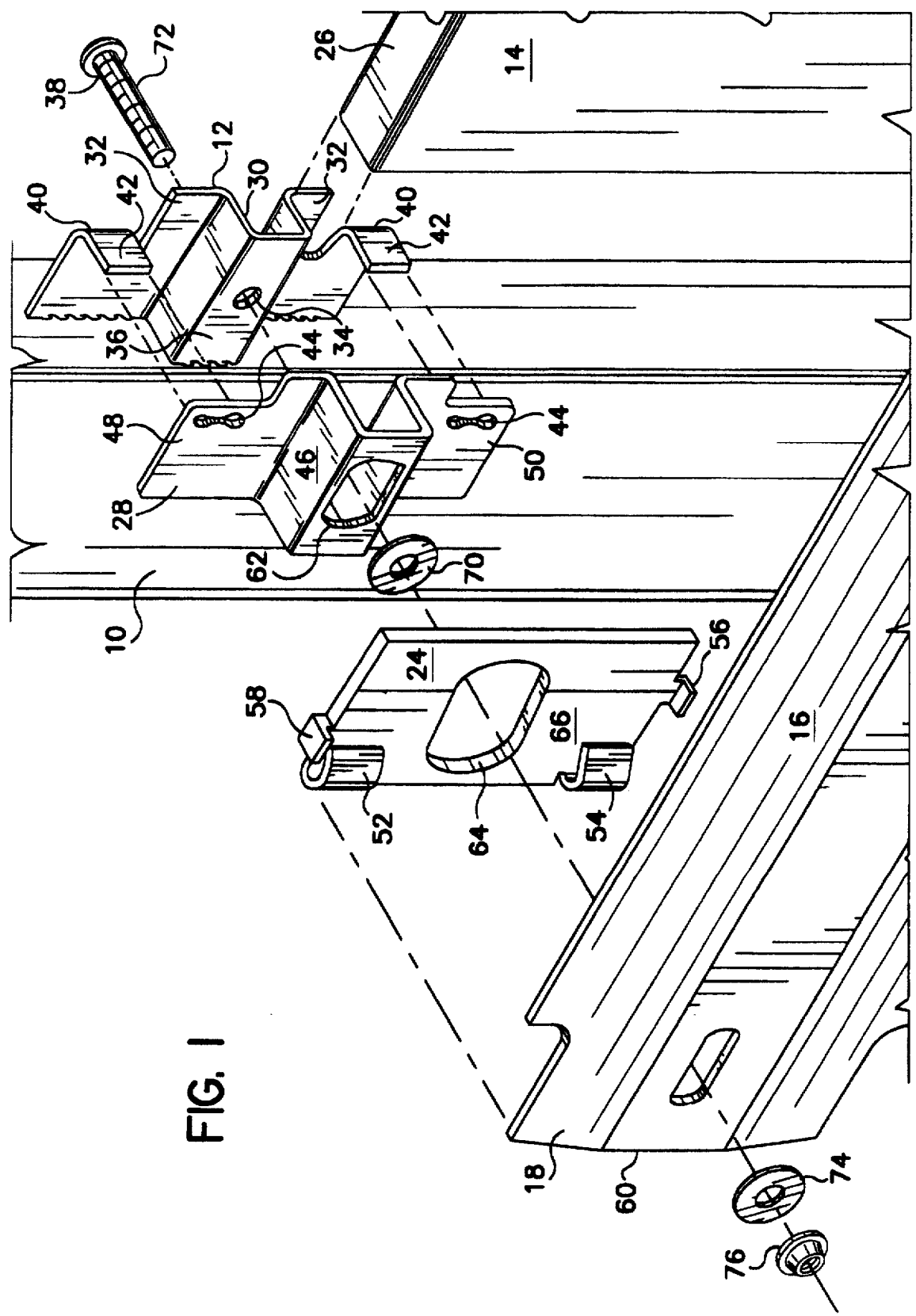
FIG. 1 is an exploded perspective view of a portion of an auto rack side panel assembly in accordance with a preferred embodiment of the invention.
Figure 2:
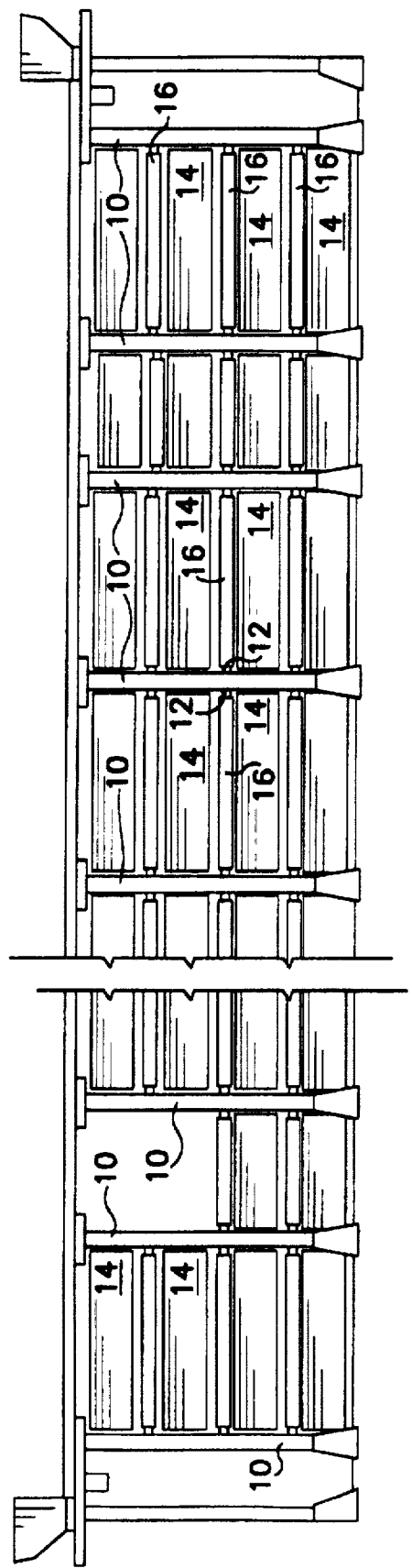
FIG. 2 is a side elevational view of an auto rack side wall incorporating a plurality of assemblies in accordance with FIG. 1.
Figure 3:
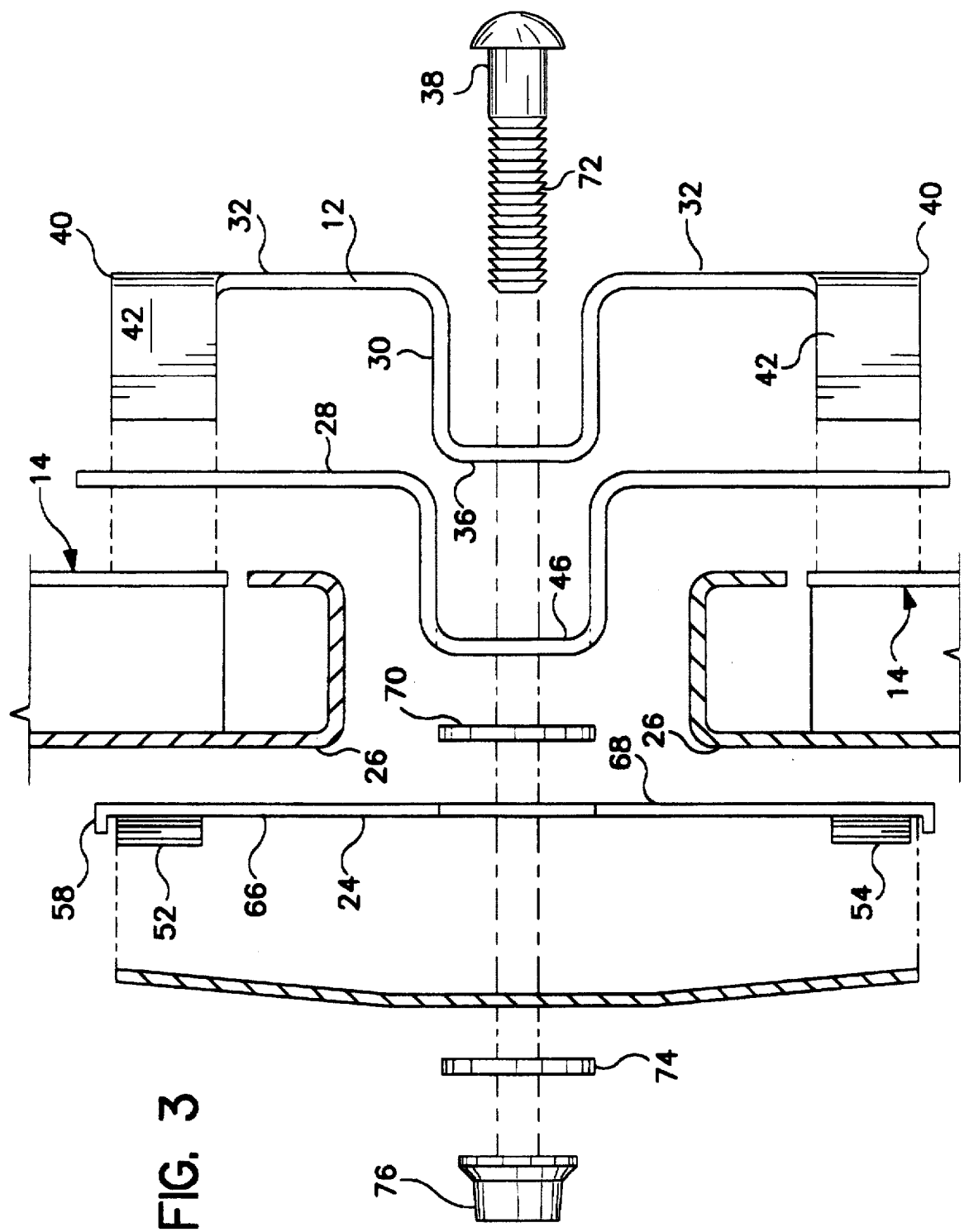
FIG. 3 is an exploded elevational view, taken partially in section, of the assembly of FIG. 1.
Figure 6:
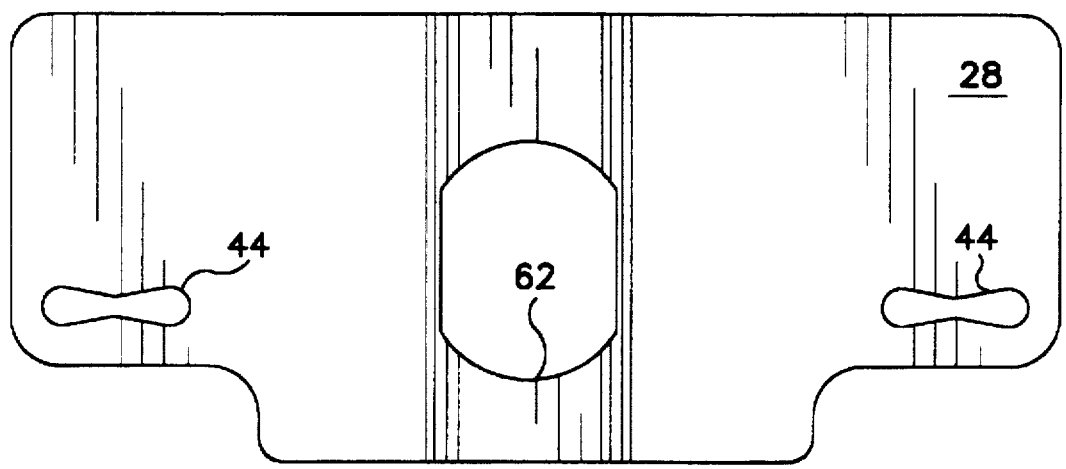
FIG. 6 is a side view of a bracket cover used in the assembly of FIG. 1.
Figure 7:
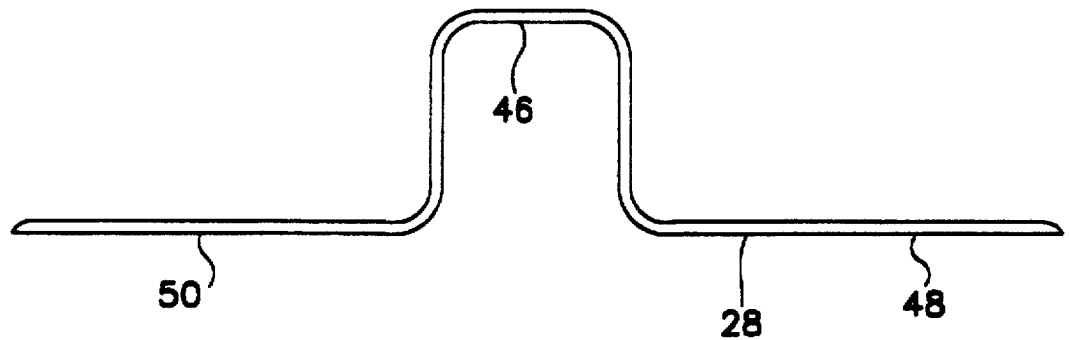
FIG. 7 is an end view thereof.
Figure 8:
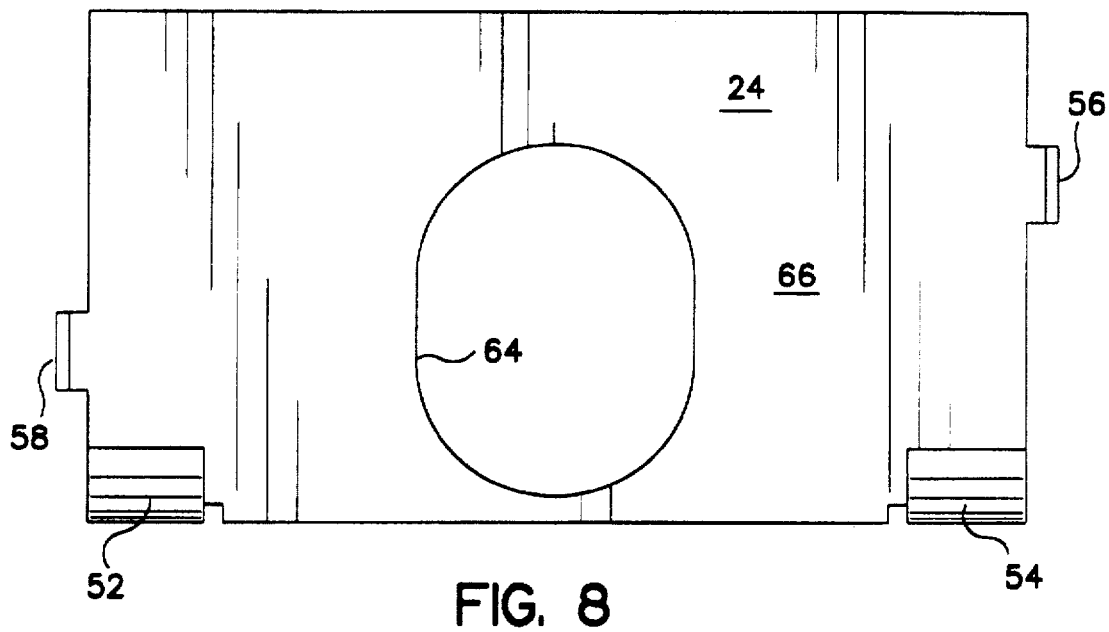
FIG. 8 is a side view of a plate cover used in the assembly of FIG. 1.
Figure 9:
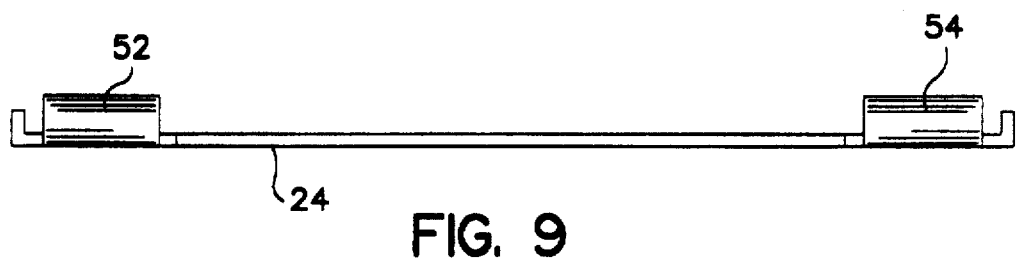
FIG. 9 is an end view thereof.
Figure 10:
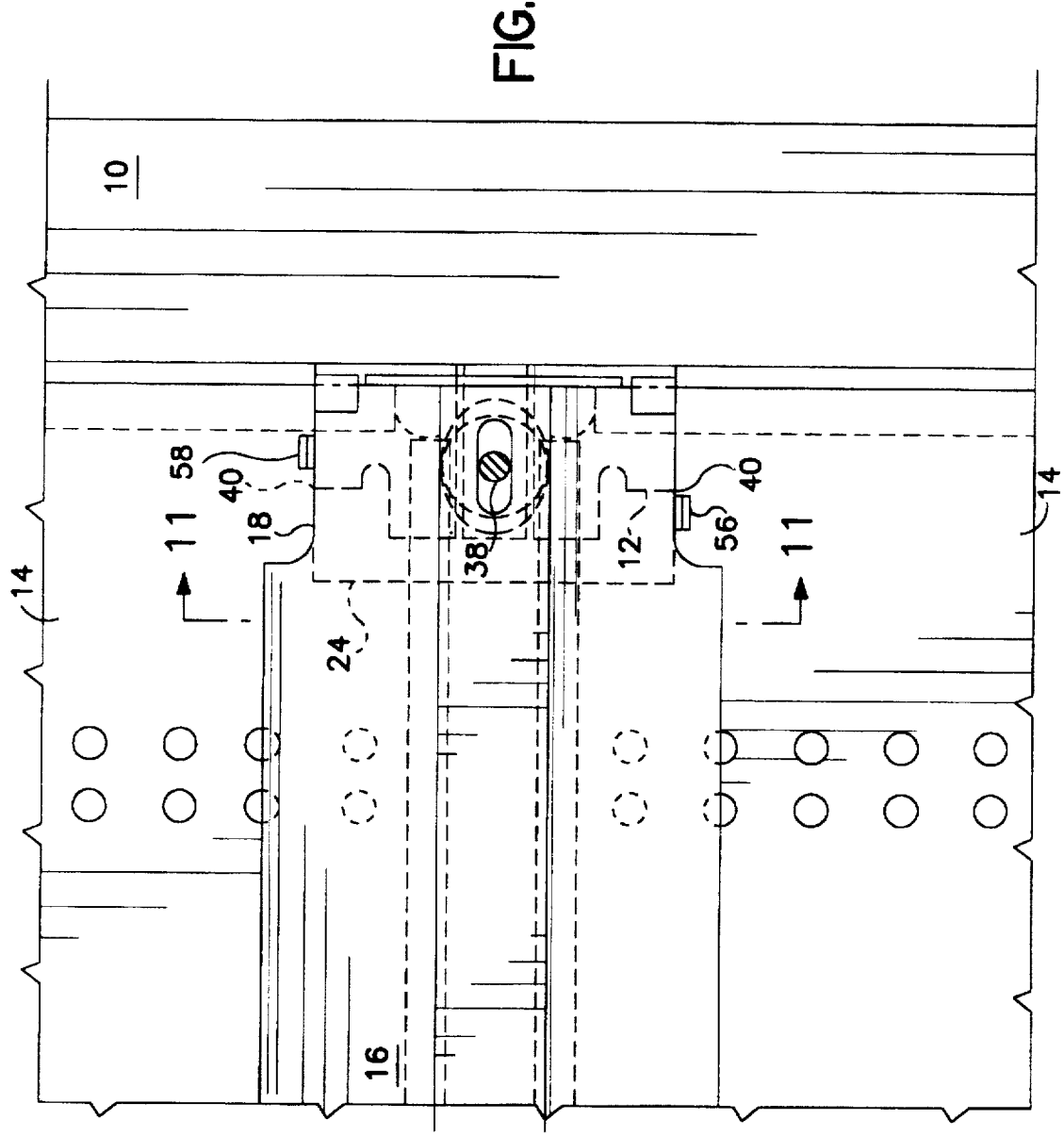
FIG. 10 is a side elevational view of the assembly of FIG. 1, shown in its assembled configuration.
Figure 11:
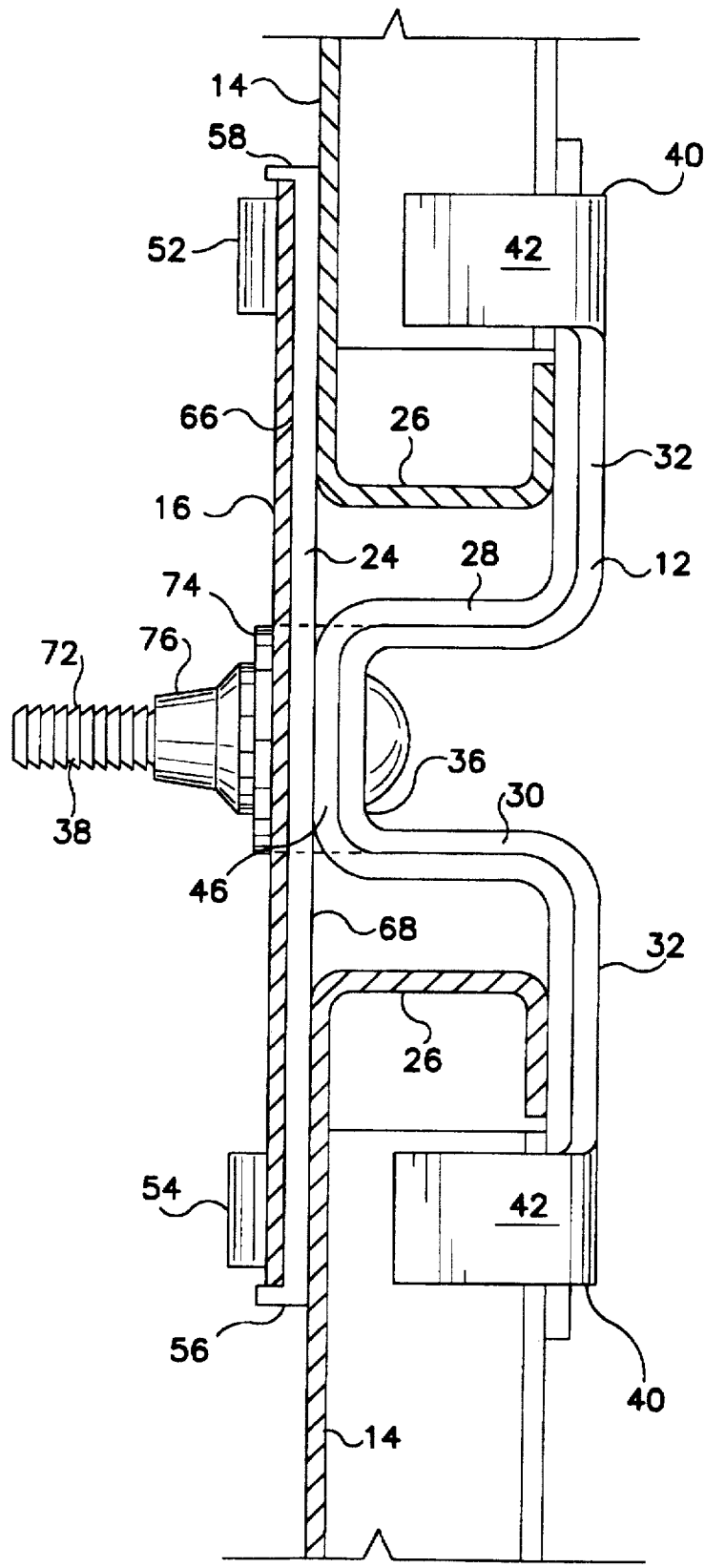
FIG. 11 is a sectional view taken substantially along line 11—11 in FIG. 10, and shown on an enlarged scale.

An auto rack railway car typically comprises a rack for supporting automotive vehicles supported on a flat car. The rack typically has a pair of side walls which, as shown in FIG. 2, each comprise a plurality of substantially vertical posts 10 for supporting internal decks and the side panels. The vertical posts 10 have brackets 12 welded or otherwise secured thereon, and a plurality of generally rectangular, perforated panels or screens 14 extending between the vertical posts.

In the illustrated embodiment, horizontal gaps between vertically adjacent panels are covered by elongated galvanized steel dust closure plates or cover plates 16 which are attached to the side panels above and below them by Huck fasteners, conventional threaded fasteners such as nuts and bolts, rivets, or other suitable fasteners.

Each of the end portions 18 of each of the elongated cover plates serves as a clamping plate for clamping vertically adjacent corners of two side panels to a bracket. Each of the end portions 18 is of reduced vertical dimension. Each end portion 18 preferably has a portion of minimum vertical dimension approximately equal in vertical dimension to the maximum vertical dimension of the bracket, and has a longitudinal dimension approximately equal to the maximum vertical dimension of the bracket.

To facilitate attachment of the cover plate 16 to the side panels above and below it, the cover plate 16 may have vertically elongated slots 20 at intervals spaced from its ends. The slots are aligned with holes in the panels, to enable fasteners such as Huck fasteners to be inserted through the aligned slots and holes so that the cover plates are attached securely to the panels. Preferably, the cover plates and panels are substantially immovable relative to one another after insertion of the fasteners, although the panels may be permitted to move slightly relative to their associated brackets in response to flexure of the auto rack frame.

In accordance with a feature of the preferred embodiment, plate covers 24 are preferably provided to fit over the end portions 18 so as to be disposed between the end portions and the panel corners 26 to reduce or avoid abrasion and rusting of the panel corners and end portions 18 as a result of friction with one another. Bracket covers 28 are also preferably provided to fit over the brackets between the brackets and the panel corners to reduce or avoid abrasion and rusting of the panel corners 26 and brackets 12 resulting from friction with one another.

Each of the brackets 12 preferably has a generally hat-shaped cross section, comprising a central channel-shaped portion 30 and a pair of flange portions 32 extending upward and downward therefrom. The bracket 12 preferably has a hole 34 formed in a vertical web 36 of the central portion 30 to accommodate a fastener 38. The bracket preferably has a reduced longitudinal dimension adjacent its upper and lower corners 40, and preferably has integral tabs 42 bent outward for mechanical interengagement with slots 44 in the bracket cover 28 to enable the bracket cover to be secured on the bracket prior to clamping of the side panel 14 onto the bracket.

The bracket cover 28 preferably has upper and lower hourglass-shaped slots 44 therein to receive the tabs 42 in an interference fit, with a central waist portion of the hourglass-shaped slot gripping the tab. The bracket cover 28 preferably is dimensioned so as to entirely cover the outer side of the bracket without protruding substantially beyond the edges thereof. The bracket cover preferably is dimensioned and shaped substantially similarly to the bracket, comprising a central channel-shaped portion 46 for receiving the central channel-shaped portion 30 of the bracket, and upper and lower flanges 48 and 50 extending upward and downward from the central channel-shaped portion to cover the corresponding flange portions of the bracket.

It should be appreciated that, in other embodiments, other means may be provided to provide mechanical interengagement between the bracket cover and the bracket. For example, tabs may be provided on the bracket cover to penetrate apertures or slots in the bracket, or to wrap around the edges of the bracket. Furthermore, adhesives might be provided on the cover and/or the bracket itself. Also, tape, plastic clips, or other mechanical fasteners could be employed in other embodiments to secure the bracket cover onto the bracket.

Similarly, any of the aforementioned means, or other means, could be employed in various embodiments to secure the plate cover onto the end portion of the cover plate. In the illustrated embodiment, securement of the plate cover 24 onto the end portion 18 of the cover plate is achieved by the provision of a pair of end tabs 52 and 54 on an end edge of the clamp plate cover which are doubled back over an end portion of the plate cover so as to have inner surfaces spaced from the outer surface of the cover by a dimension approximately equal to the thickness of the cover plate 16, and bottom and top tabs 56 and 58 extending outward to engage the upper and lower edges of the plate end portion 18. The bottom and top tabs 56 and 58 constrain the cover against vertical displacement relative to the end portion of the plate cover. The end tabs 52 and 54 wrap around the end edge of the end portion 18 to aid in maintaining the cover in place on the end portion 18. This arrangement enables the plate cover easily to be slipped onto the end portion 16.

The bracket cover and the plate cover have generally centrally disposed mounting holes 62 and 64 respectively preformed therein to accommodate the fastener 38 for clamping the corner of the side panel.

The holes 62 and 64 in the illustrated embodiment are horizontally elongated, rather than being circular, and the hole 64 in the plate cover 24 is larger than that in the bracket cover 28, to accommodate variations in the relative positions of the various components both during installation of the side panel assemblies and thereafter.

The plate cover 24 preferably comprises a thin, preformed plastic item of defined shape having a generally rectangular configuration with an outer surface 66 for engaging the end portion of the plate, an inner surface 68 for engaging the side panel.

In the illustrated embodiment, washer 70 preferably is provided within the holes of the bracket cover 28 and the plate cover 24 to act as a spacer. The washer preferably has sufficient compressive strength to prevent crushing of the covers 24 and 28, and to this end may be made of steel or another metal, or a plastic or composite material having sufficient strength in compression. The washer 70 also serves to prevent the side panel corners from being clamped too tightly.

The fastener 38 in the illustrated embodiment is a Huck fastener of a type which is commercially available and well-known in the railroad industry. It should be appreciated that other types of fasteners might be used in other embodiments, including conventional nuts and bolts, plastic fasteners of various types, plastic or metal rivets, studs permanently mounted on the brackets as by being welded thereto or integrally formed thereon, alone or in combination with nuts or other fastener components engageable therewith, or other suitable fastening arrangements.

The method of installing the side panels preferably comprises fitting the covers 24 and 28 over their respective associated brackets 12 and cover plate ends 18, inserting a first fastener component 72 through the holes in the bracket and bracket cover, placing a washer 70 on the first fastener component, placing the panels 14 in position, placing the covered plate end portion 18 over adjacent corners 26 of vertically adjacent panels, then placing a second washer 74 and a second fastener component 76 onto the first fastener component, and applying appropriate mechanical force to effect clamping of the vertically adjacent side panel corners. Where corner caps or envelopes are to be snapped onto the side panel corners at the upper and lower extremities of the side wall, these caps or envelopes are preferably snapped in place prior to positioning of the side panels for installation.

From the foregoing it should be appreciated that the invention provides a novel and improved method and apparatus for installing and securing auto rack side panels on an auto rack car. The invention is not limited to the embodiments described above, nor to any particular embodiments, but rather is further described and more particularly pointed out by the following claims.

What is claimed is:

1. In an auto rack car having a pair of side walls comprising a plurality of generally rectangular panels having horizontally extending gaps therebetween, a plurality of brackets supporting the panels at their corners, and a plurality of elongated dust closure plates spanning the gaps between at least some of the panels, the end portions of the elongated dust closure plates being clamped against panel corners opposite the brackets so that said end portions function as clamping plates to clamp the panel corners in place;

the improvement comprising preformed, discrete plate covers which fit over said end portions and which are disposed between said end portions and said panel corners to avoid potential damage to the panel corners as a result of friction with said end portions, and spacers of a material harder than the cover to limit compression of said plate covers, each of said plate covers having an opening therein and having one of said spacers disposed within said opening.

2. The improvement of claim 1 further comprising bracket covers which fit over said brackets between said brackets and said panel corners to avoid potential damage to said panel corners resulting from friction with said brackets.

3. The improvement of claim 2 further comprising means on said plate covers and means on said bracket covers to provide mechanical interengagement with said end portions and said brackets respectively.

4. The improvement of claim 2 wherein the bracket cover comprises a thin, preformed discrete unit having a generally hat-shaped profile, comprising a central channel-shaped portion and a pair of flange portions extending outward on either side thereof, said bracket cover being dimensioned to fit snugly on the auto rack side panel support bracket with a central portion of the bracket being received in the central channel-shaped portion of the cover.

5. The improvement of claim 4 wherein said bracket cover has a mounting hole preformed therein generally centrally of said central channel-shaped portion.

6. The improvement of claim 4 wherein said bracket cover has a pair of slots formed therein which are dimensioned to fit a pair of tabs on the auto rack panel support bracket.

7. The improvement of claim 4 wherein said bracket cover is dimensioned so as to entirely cover the outer side of the bracket without protruding substantially beyond the edges thereof.

8. The improvement of claim 1 wherein the clamp plate cover comprises a thin, preformed item of defined shape having a generally rectangular configuration having an outer surface for engaging the end portion of the plate, an inner surface for engaging the side panel, and attachment means thereon for holding the cover in place on the end portion of the plate during installation of the plate.

9. An improvement in accordance with claim 8 wherein said attachment means comprise one or more tabs defining a slot for receiving an edge of the plate.

10. An improvement in accordance with claim 9 wherein said clamp plate cover has a mounting hole preformed therein generally centrally thereof.

11. An improvement in accordance with claim 8 wherein said attachment means comprise a pair of tabs on an end edge of the cover having inner surfaces extending generally parallel to and spaced from the outer surface of the cover by a dimension approximately equal to a thickness of the plate, a bottom tab on the bottom edge of the cover, and an upper tab on the upper edge of the cover, said bottom and upper tabs being spaced from one another by a distance about equal to a vertical dimension of the end portion of the plate between the bottom and upper tabs.

12. In an auto rack car having a pair of side walls comprising a plurality of generally rectangular panels having horizontally extending gaps therebetween, a plurality of brackets supporting the panels at their corners, and a plurality of elongated dust closure plates spanning the gaps between at least some of the panels, the end portions of the elongated dust closure plates being clamped against panel corners opposite the brackets so that said end portions function as clamping plates to clamp the panel corners in place;

the improvement comprising plate covers which fit over said end portions and which are disposed between said end portions and said panel corners to avoid potential damage to the panel corners as a result of friction with said end portions;

spacers to limit compression of said plate covers;

bracket covers which fit over said brackets between said brackets and said panel corners to avoid potential damage to said panel corners resulting from friction with said brackets; and means on said plate covers and means on said bracket covers to provide mechanical interengagement with said end portions and said brackets respectively;

wherein said means on said plate covers comprise one or more tabs on each of said plate covers.

13. The improvement of claim 12 wherein said means on said bracket covers comprise slots on said bracket covers, and wherein said brackets have tabs thereon which extend into said slots.

14. A method of installing generally rectangular auto rack side panels on an auto rack car having a plurality of brackets for supporting the corners of the panels comprising:

providing a plurality of covers for at least some of the brackets;

fitting the covers over said at least some of the brackets so that the covers are supported on the brackets;

placing the panels in positions with their corners contacting adjacent respective associated bracket covers, with said covers preventing contact between the side panel corners and the brackets; and clamping the side panels in place;

wherein the bracket covers are secured in place by providing an interference fit between a portion of the bracket cover and a portion of the bracket, and wherein providing an interference fit comprises inserting a tab on one of said bracket and said cover into a slot on the other of said bracket and said cover.

15. A method in accordance with claim 14 wherein clamping the side panels in place comprises using as a clamping plate an end portion of an elongated dust closure plate extending substantially the entire length of the panel.

16. A method in accordance with claim 15 further comprising placing a cover over said end portion so that said cover is between the said end portion and an adjacent side panel corner.

17. A method in accordance with claim 16 further comprising placing corner caps over certain side panel corners.

* * * * *